United States Patent [19]

Riddel

[11] 4,134,470

[45] Jan. 16, 1979

[54] CRUISE CONTROL SYSTEM USING POSITIVE PRESSURE TO BOOST VACUUM

[75] Inventor: John W. Riddel, Fenton, Mich.

[73] Assignee: General Motors Corporation, Detroit, Mich.

[21] Appl. No.: 864,527

[22] Filed: Dec. 27, 1977

[51] Int. Cl.² ............................................. B60K 31/00
[52] U.S. Cl. ................................. 180/108; 123/103 R; 417/190
[58] Field of Search .................... 180/108, 105 R, 109; 123/103 R; 137/114; 417/190, 191, 188, 189

[56] References Cited

U.S. PATENT DOCUMENTS

| | | | |
|---|---|---|---|
| 1,417,853 | 5/1922 | Nash | 417/188 |
| 1,560,190 | 11/1925 | Richard | 417/191 |
| 1,820,884 | 8/1931 | Hueber | 417/189 |
| 2,747,790 | 5/1956 | Schnitz | 417/191 |
| 3,322,227 | 5/1967 | Thorner | 123/103 R |
| 3,441,104 | 4/1969 | Hagler | 123/103 R |

Primary Examiner—Kenneth H. Betts
Attorney, Agent, or Firm—D. D. McGraw

[57] ABSTRACT

An aspirator using pressure from a suitable source boosts the vacuum available when intake vacuum drops. The pressure source may be the A.I.R. pump, for example. At low throttle settings engine vacuum is high and pump pressure is low. At 25% throttle engine vacuum is lower and the A.I.R. pump pressure is higher. With some flow the output vacuum from the aspirator is greater than the engine vacuum. This is also true at greater throttle openings. The device has a regulation effect causing output variation to be less than the variation in manifold vacuum. This makes the lock-up transient and lockup error less dependent on engine speed and makes cruise performance more uniform over the entire range of cruise speeds.

6 Claims, 4 Drawing Figures

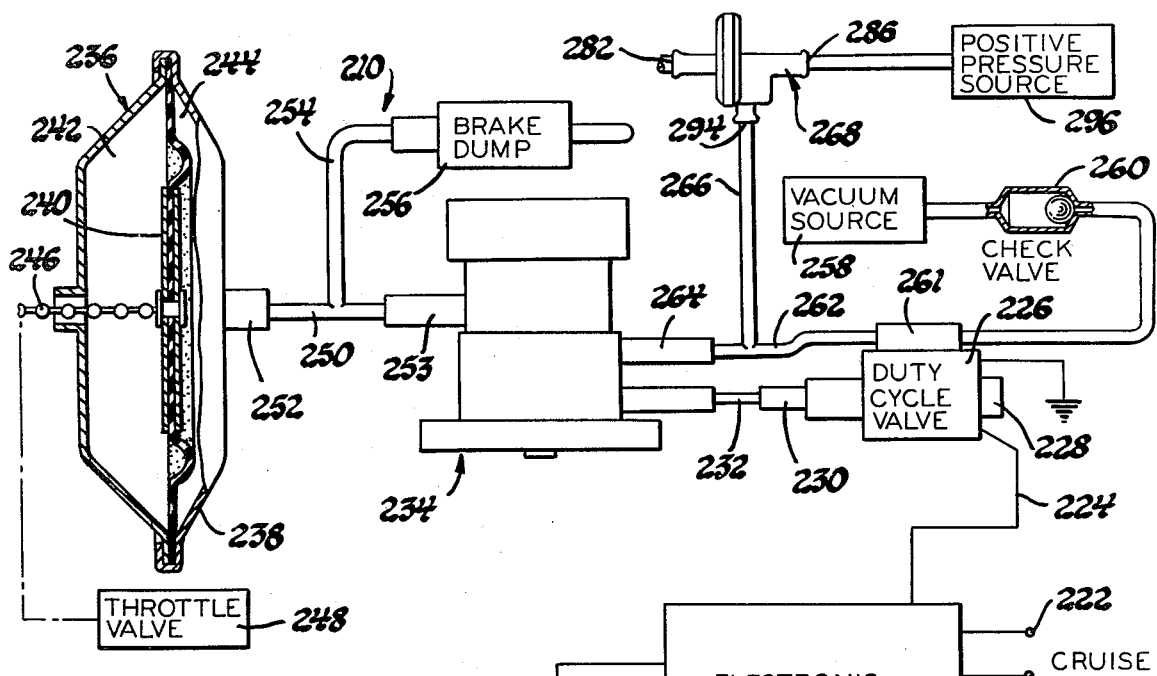
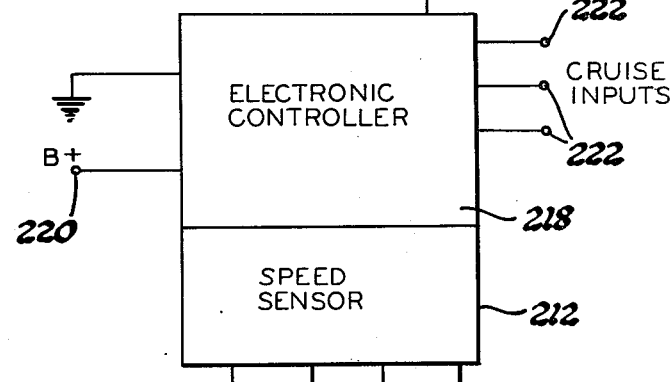
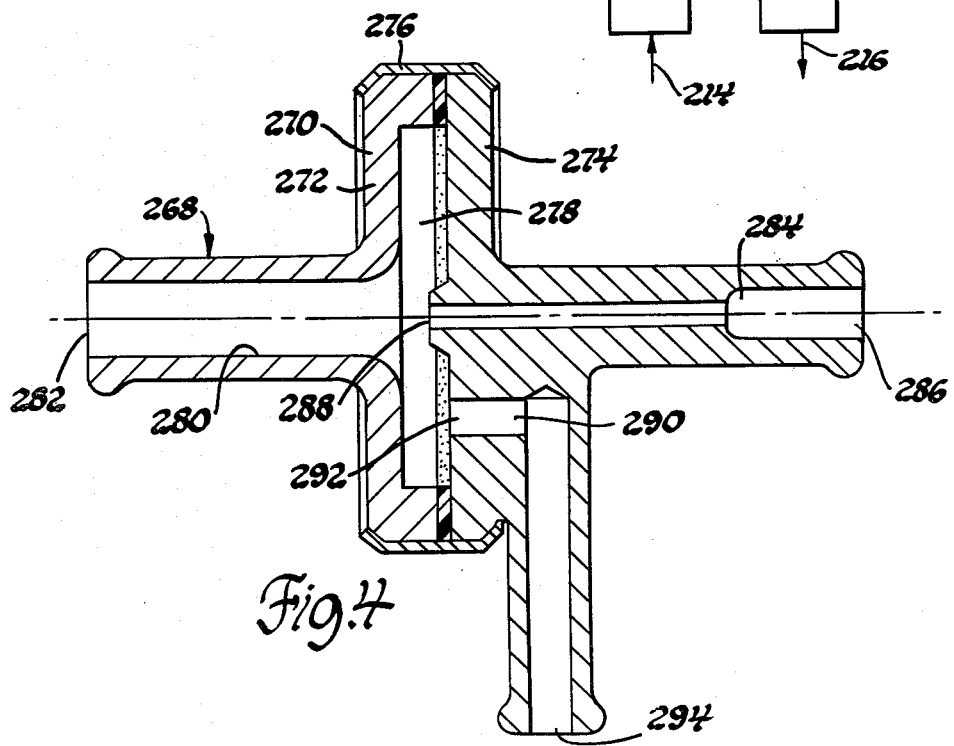

CRUISE CONTROL SYSTEM USING POSITIVE PRESSURE TO BOOST VACUUM

The invention relates to a vehicle road speed control system and more particularly to such a system having a vacuum powered servomotor controlled by a speed error responsive valve, which in turn is controlled by actual vehicle speed setting. The system may be of the type more particularly disclosed in U.S. Pat. No. 3,441,104, entitled, "Vehicle Speed Transducer" and issued Apr. 29, 1969. The system may also be of the type disclosed in U.S. patent application Ser. No. 845,881, entitled "Flow Amplifier Valve Assembly", filed Oct. 27, 1977 and assigned to the common assignee.

When vehicle road speed control systems of the types noted are utilized in vehicles having small engines and a low power to weight ratio, less vacuum is often available to operate the system. It is, therefore, desirable to be able to boost the vacuum under such conditions. When such systems are used with engines having little or no intake manifold vacuum, such as diesel engines, and particularly when such engines are supercharged, it is also desirable to boost available vacuum as needed. This is true whether the vacuum is from a naturally aspirated intake manifold or from a separate vacuum source driven by the engine, if such source is unable to supply vacuum upon demand to the fullest extent required under any and all operational conditions.

Engines of the types mentioned above often have, as a part of the emissions control system, a positive air pressure pump utilized to inject air under pressure into a portion of the engine exhaust. Such a pump is usually referred to as an A.I.R. pump. Other sources of positive pressure which may be used are engine exhaust back pressure, a supercharger, and a separate positive pressure source for suspension systems. If no such source of positive air pressure is available, one may be supplied for use in the system embodying the invention.

In one embodiment of the invention, the vacuum boost device takes the form of an aspirator having a connection receiving positive air pressure from a suitable source. The aspirator is connected to vacuum and has a vacuum output port connected to supply vacuum to the portion of the cruise control system utilizing vacuum. The device will also have a check valve between the vacuum connection to the cruise control system and the aspirating chamber, as well as a ball check valve between an atmospheric air inlet and the vacuum outlet port and positioned in parallel flow relation with the other check valve. The positive air pressure from the source passes through an aspirator nozzle into the aspirator chamber. This is a relatively low flow and does not overcome the vacuum being supplied to the aspirator chamber by the intake manifold. The flow out of the nozzle is directed toward the passage and port connected to the engine intake manifold or other normal source of vaccum.

In another embodiment of the invention, the vacuum booster is similarly constructed but has no check valves as above described. A check valve is supplied between the normal vacuum source and a connection to the vacuum outlet port of the vacuum booster, which connection also delivers vacuum to the portion of the control system using the vacuum. The positive pressure passes through the aspirator nozzle so as to generate aspirated vacuum in the aspirator chamber, which is open to atmosphere through an atmosphere passage and port. The discharge from the nozzle is directed through the atmosphere passage and port.

IN THE DRAWINGS:

FIG. 3 is a schematic representation of another system utilizing the vacuum booster, and embodying the invention.

FIG. 4 is a cross section view of the vacuum booster utilized in the system of FIG. 3.

Figure 1:
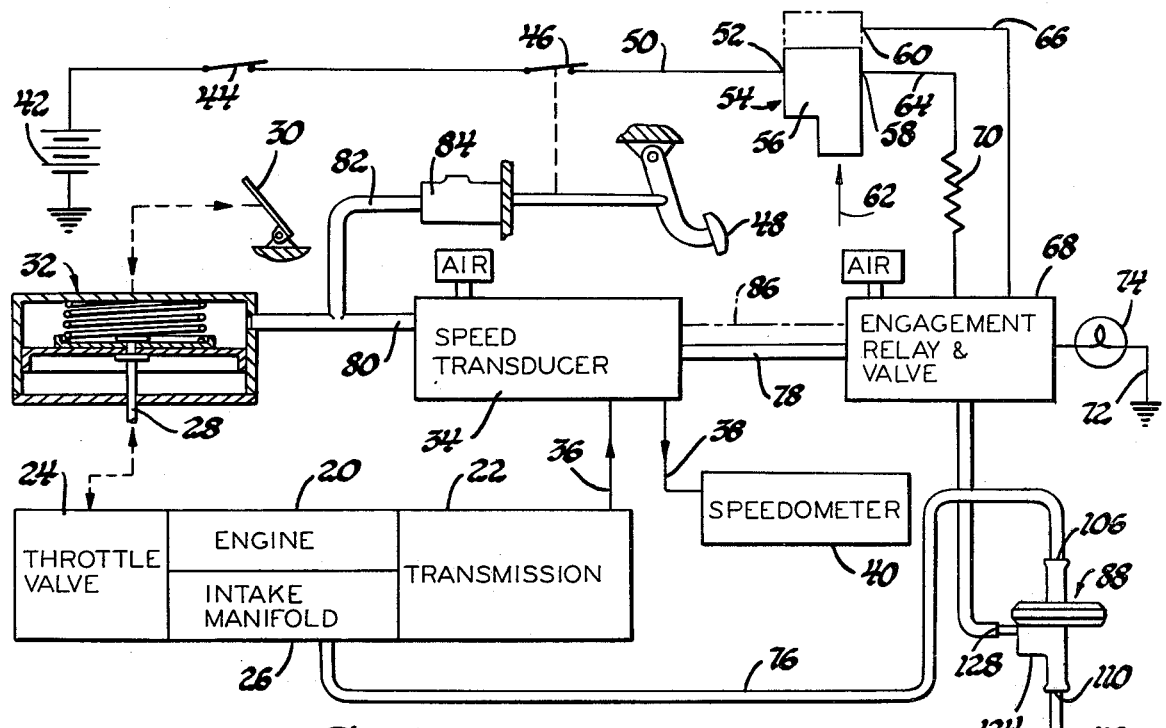
FIG. 1 is a schematic representation of a vehicle road speed control system utilizing a vacuum booster, and embodying the invention.

The system of FIG. 1 is based on the system disclosed in U.S. Pat. No. 3,441,104. The system is shown installed in a motor vehicle having an engine 20 driving a vehicle transmission 22 and having a throttle valve 24, an engine intake manifold 26, and throttle linkage 28 connected to the throttle valve and manually actuated by the accelerator pedal 30. The system includes a power servomotor 32 which is connected to the throttle linkage 28. As schematically illustrated, the power servomotor 32 is actually a part of the throttle linkage 28 interconnecting the accelerator pedal 30 with the throttle valve 24. A speed transducer assembly 34 receives an actual vehicle speed signal through the transmission output shaft driven flexible cable 36 an compares it to a desired vehicle speed to generate a speed error signal to control the servomotor 32. An extension 38 of the flexible cable 36 drives the usual vehicle speedometer 40.

Portions of the system are electrical and include the source of electrical energy schematically illustrated as the vehicle battery 42, the ignition switch 44 and a normally closed switch 46, which is opened when the vehicle brakes are applied by depression of the brake pedal 48. These electrical elements are in series in electrical lead 50, which connects the brake switch 46 to a contact 52 of a manually controlled switch 54. The slide bar 56 of switch 54 is biased so that it is normally in electrical contact with switch contact 52 and another switch contact 58. A third switch contact 60 is so positioned that movement of the slide bar 56 in the direction of the arrow 62 will cause all three contacts 52, 58 and 60 to be in electrical contact with the slide bar 56. This position of the slide bar is illustrated in dashed lines. Further movement of the slide bar 56 in the direction of arrow 62 will electrically disconnect contact 52 from the slide bar. Electrical leads 64 and 66 are respectively connected to contacts 58 and 60 and lead to the engagement relay and valve assembly 68. Lead 64 contains a suitable resistor 70. Lead 72 from the engagement relay 68 may be suitably connected to electrical ground through a signal lamp 74.

Figure 2:
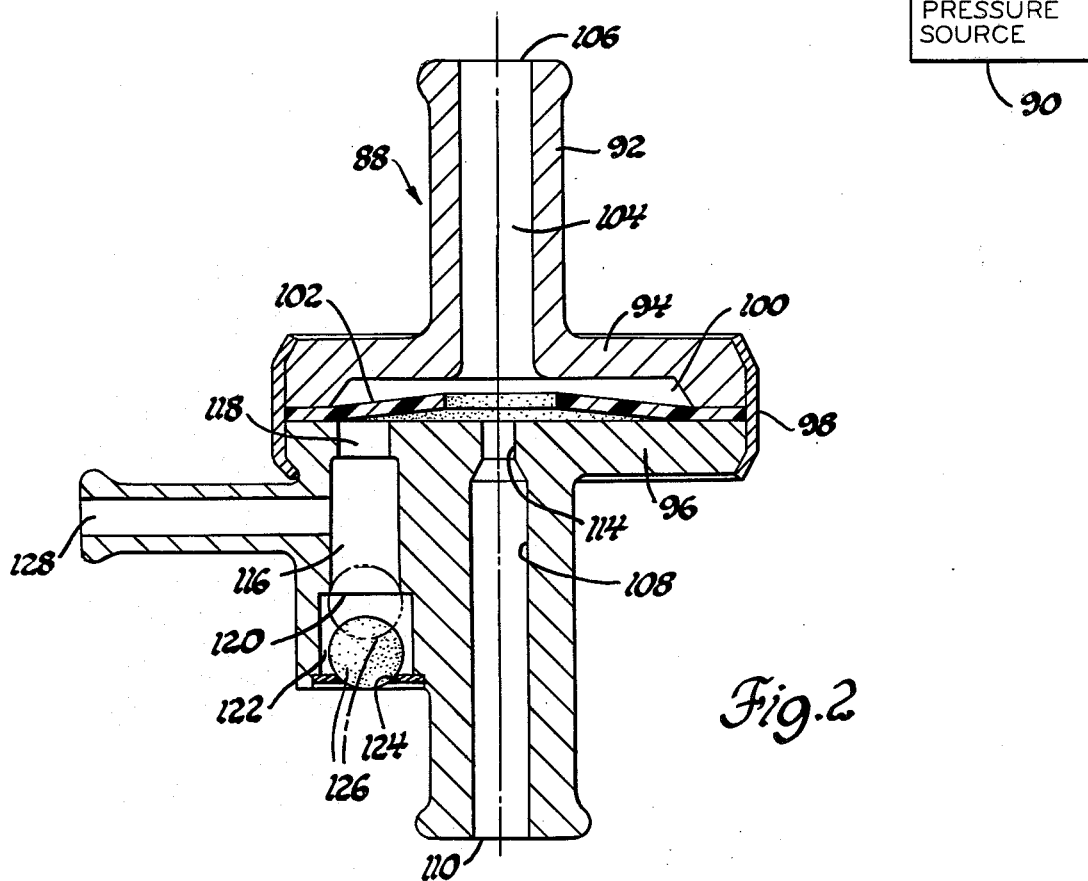
FIG. 2 is a cross section view of a vacuum booster embodying the invention and utilized in the system shown in FIG. 1.

The fluid circuit includes a conduit 76 fluid connecting the engine intake manifold 26 to the engagement relay and valve assembly 68 through the vacuum booster 88. Vacuum booster 88 is also connected to the positive pressure source 90. The vacuum booster 88 is illustrated in FIG. 2 and described below in greater detail. A conduit 78 fluid connects the speed transducer assembly 34 and the assembly 68. The valve portion of assembly operates to close conduit 76 and open conduit 78 to atmospheric pressure when the engagement relay is deactivated, and to fluid connect conduits 76 and 78 when the engagement relay is activated. Thus engine intake manifold vacuum is provided to the speed transducer assembly 34 when the system is operative. The speed transducer assembly 34 generates a speed error signal by proportioning vacuum from conduit 78 and atmospheric air pressure in accordance with a desired vehicle speed and the actual vehicle speed signal received through cable 36. This signal is transmitted through conduit 80 to the power servomotor 32 and causes the servomotor to adjust the opening and closing of the throttle valve 24 in accordance with varying road load conditions. A conduit 82 is connected with conduit 80 and a valve 84. This valve is normally in the closed position when the brake pedal 48 is in the released position, so that the end of conduit 82 is closed. However, when the brake pedal is depressed, the valve 84 opens to atmospheric pressure, immediately allowing this pressure to enter the servomotor 32 and therefore deactivate the servomotor. Since the brake switch 46 is also opened by depression of the brake pedal, the engagement relay and valve assembly 68 will also be de-energized so that the valve portion of that assembly will close the end of conduit 76 connected to engagement and relay valve assembly 68 and receiving vacuum through vacuum booster 88. The speed transducer 34 is schematically illustrated as having a mechanical connection 86 with the engagement relay and valve assembly 68. This connection is provided to drive a minimum speed switch electrically connected with electrical lead 66 and which is open until a certain minimum vehicle speed is attained. This speed may, for example, be set at 25 m.p.h. By employing this switch, the engagement relay may not be energized at lower speeds even though the switch 54 is operated in an attempt to activate the system.

The vacuum booster 88 has a housing 92 made of housing sections 94 and 96. The housing sections are joined by a crimp ring 98 so that an expansion chamber 100 is defined between the housing sections. An annular gasket and check valve 102 is positioned between the housing sections to seal chamber 100 against atmospheric leaks. Housing section 92 has a passage 104 extending from the center of chamber 100 outwardly to vacuum port 106 which is connected to the portion of conduit 76 extending from intake manifold 26 to vacuum booster 88.

Housing section 96 has a positive pressure inlet passage 108 which terminates at inlet port 110. Inlet port 110 is connected by a suitable conduit 112 to the positive pressure source 90. Housing section 96 has an aspirator nozzle 114 at the end of passage 108 and opening into chamber 100 and in axial alignment with passage 104 so that positive pressure air passing through nozzle 114 is projected through chamber 100 and passage 104. Housing section 96 has another passage 116 generally parallel to passage 108 and having one end 118 opening into chamber 100. The other passage end 120 is connected through a check valve chamber 122 to an atmospheric port 124. A ball check valve 126 is positioned in chamber 122 and is movable to open and close passage end 120. Check valve 126 is a lightweight valve, which at rest is slightly spaced from a seat formed by passage 120, but readily closes against the seat when subatmospheric pressure is generated in passage 116. A vacuum port 128 is provided in housing section 96 and communicates with passage 116 between the passage ends 118 and 120. Port 128 is connected to the other portion of conduit 76 leading to the engagement relay and valve 68. Gasket and check valve 102 overlies passage end 118. The portion so overlying the passage end forms a check valve located within chamber 100. The gasket and check valve 102 is made of a suitable flexible material and will open to permit flow of air from passage 116 into chamber 100, but will close passage end 118 to prevent flow of air from chamber 100 to passage 116.

The vehicle road speed control system 210 of FIG. 3 schematically illustrates a speed sensor 212 driven by a speedometer drive cable 214 from a suitable portion of the vehicle such as the transmission output shaft, and having an output drive cable 216 connected to drive the vehicle speedometer. The speed sensor is connected to an electronic controller 218. The controller has a source of electrical energy 220 and suitable cruise control inputs 222. The controller also receives a vehicle speed signal from the speed sensor 212. It generates a control signal in the controller output lead 224. The control signal may be a duty cycle signal if a duty cycle type mechanism such as that schematically illustrated is used. It may be a continuously variable speed error signal if a transducer of the type cited in the above noted U.S. Pat. No. 3,441,104 is used. Output lead 224 is connected to control valve 226, which is schematically identified as a duty cycle valve. The valve 226 has an atmospheric air inlet 228 and an outlet 230 connected to a conduit 232 leading to the flow amplifier valve assembly 234.

The system 210 also has a power unit 236 which is illustrated as a diaphragm type servomotor composed of a housing 238 having a diaphragm type power wall 240 dividing the housing into an atmospheric pressure chamber 242 and a variable pressure chamber 244. An output member 246, illustrated as a pull chain, is suitably operatively connected to the vehicle engine throttle valve 248 to control that valve when the system is actuated. As is usual in systems of this type, the output member 246 is capable of only exerting an opening pull on the throttle valve against the force of the throttle valve closing spring.

A conduit 250 is connected to a port 252 of the servomotor and the output port 253 of the valve assembly 234 so that the pressure in conduit 250 is communicated with chamber 244 of the power unit. A conduit 254, branching from conduit 250, is connected to a normally closed valve 256. Valve 256 when open admits atmospheric pressure into conduit 254 and therefore into chamber 244 through conduit 250 and port 252. Valve 256 is arranged to be opened when the vehicle brakes are applied. It is also common to arrange to deactuate the electronic controller 218 when the brakes are applied. This may be done by suitable structure well known in the art and not shown in the drawing. A vacuum source 258 provides the subatmospheric pressure for operation of the entire system. It is connected through a check valve 260, engagement and relay valve 261, and a conduit 262 to the port 264 of valve assembly 234. A branch conduit 266, which connects into conduit 262 between valve 261 and port 264, is connected to the vacuum booster 268. This booster is illustrated in greater detail in FIG. 4. Booster 268 has a housing 270 formed of housing sections 272 and 274 secured together by a crimp ring 276. Chamber 278 is formed by the two housing sections. Housing section 272 has a passage 280 leading to atmospheric air port 282. This port may be connected to clean atmospheric air from the downstream side of the engine air cleaner, or may have a separate filter for this purpose. Housing section 274 has a passage 284 with one end 286 forming an inlet port and the other end 288 formed to provide a pressure nozzle. The nozzle 288 opens into chamber 278 and is in axial alignment with passage 280 so that the stream of air from the nozzle 288 is directed through passage 280 and to atmosphere through port 282. Housing section 274 has another passage 290 with one end 292 opening into chamber 278 and the other end opening to the vacuum port 294. Port 294 is connected to branch conduit 266 and port 286 is connected to the positive pressure source 296. This source may be any suitable source such as that described above in discussing positive pressure source 90.

When the control system of FIG. 1 is in normal vehicle road speed controlling operation, sufficient vacuum is provided by intake manifold 26, and the vacuum booster 88 operating together. The vacuum booster assures a sufficient supply of vacuum by aspiration. The vacuum created in chamber 100 opens check valve 102. The vacuum so created is transmitted through passage 116 to close and maintain check valve 126 seated and is delivered to the engagement relay and valve 68 through port 128. Details of operation of the remaining portion of the system of FIG. 1 are fully described in the above noted U.S. Pat. No. 3,441,104 and that description is herein incorporated by reference.

In operation of the vehicle road speed control system of FIG. 3, manifold vacuum from the vacuum source 258 and vacuum from the vacuum booster 268 are supplied in parallel to the flow amplifier input 264. The vacuum booster 268 gives the system the capability of operating even when the engine is at full throttle and supplies insufficient vacuum from the manifold vacuum source 258 to properly operate the system. For example, engine manifold vacuum may be about 18 inches of water at full engine throttle, while the throttle load may require the cruise control system to operate with a vacuum of about 24 inches of water. The flow capability of the vacuum booster 268 is very low. Therefore, check valve 260 is provided to prevent loss of vacuum from the vacuum booster to the vacuum source 258.

The vacuum entering engagement relay and valve 261 from source 258 is subject to that valve being closed when the cruise control system is disengaged. This valve, when so closed, opens the flow amplifier input line 262 to atmospheric air, thus preventing a buildup of vacuum from vacuum booster 268. In this arrangement, when using a transducer of the type shown in U.S. Pat. No. 3,441,104 and its engagement and relay valve, the openings in the engagement and relay valve must be sufficiently large so as not to restrict flow to the flow amplifier valve 234.

The disclosed systems embodying the invention assure sufficient vacuum to the system servomotors under all operational conditions. The output variation is less than the variation in manifold vacuum alone. Therefore, the lock-up transient and lock-up error is less dependent on engine speed and load, and cruise performance is more uniform over the entire range of cruise speeds.

What is claimed is:

1. In a vehicle road speed control system having a differential pressure powered servomotor controlling the vehicle engine to maintain a desired vehicle speed, transducer means receiving vehicle actual speed and desired speed signals and subatmospheric pressure and atmospheric pressure and generating a control pressure from said received pressures in accordance with said speed signals, said control pressure being delivered to said servomotor, and a source of subatmospheric pressure, the improvement comprising:

means for boosting the level of subatmospheric pressure from said source to a lower subatmospheric pressure level, said boosting means including
   an aspirator having a superatmospheric pressure inlet and first and second subatmospheric pressure ports, said first subatmospheric pressure port being fluid connected with said source of subatmospheric pressure, said second subatmospheric pressure port being fluid connected to deliver subatmospheric pressure to said transducer means, said superatmospheric pressure inlet and said first subatmospheric pressure port being in alignment and having located therebetween a nozzle and an expansion chamber in series so that superatmospheric pressure flows from said superatmospheric pressure inlet through said nozzle and said expansion chamber into said first subatmospheric pressure port, said second subatmospheric pressure port opening into said expansion chamber through a check valve which opens only to permit flow from said second subatmospheric pressure port toward said first subatmospheric pressure port, the flow of fluid at superatmospheric pressure through said expansion chamber entraining fluid from said expansion chamber and boosting subatmospheric pressure at said second subatmospheric pressure port to a lower subatmospheric pressure level than the pressure level of the subatmospheric pressure provided by said source.

2. In a vehicle road speed control system utilizing vacuum as a power pressure, a vacuum booster comprising:

a housing having an expansion chamber formed therein, an axially aligned inlet passage and aspirator nozzle formed at one end of said inlet passage, said nozzle opening into said expansion chamber, another passage in axial alignment with said aspirator nozzle and opening into one side of said expansion chamber on the axially opposite side thereof from said aspirator nozzle, and a vacuum passage opening into said one side of said expansion chamber at a point offset from said nozzle, said inlet passage and aspirator nozzle being adapted to receive superatmospheric pressure and discharge it through said expansion chamber and said axially aligned another passage to generate an aspirated vacuum pressure in said expansion chamber and said vacuum passage,
   and means connecting said vacuum passage in said system to deliver the aspirated vacuum pressure thereto for use as a power pressure.

3. In a vehicle road speed control system having a differential pressure powered servomotor connected to control the vehicle engine and road speed, means generating and delivering control pressures to said servomotor, and a source of vacuum pressure, said means generating said control pressures from vacuum pressure and from pressure from another source which is at higher pressure than the vacuum pressure, the improvement comprising:

a source of superatmospheric pressure;
   and a vacuum pressure booster including an aspirator receiving superatmospheric pressure from said source of superatmospheric pressure and generating aspirated vacuum pressure, said vacuum pressure booster being connected to said means to deliver the aspirated vacuum pressure thereto and provide said means with aspirated vacuum pressure, said means using vacuum pressure from said vacuum pressure source and from said vacuum pressure booster in accordance with the supply available to generate said control pressures.

4. A vehicle road speed control system comprising:
a differential pressure powered servomotor connected to control the vehicle engine and road speed;
means generating and delivering control pressures to said servomotor;
a first pressure source of vacuum pressure and a second pressure source of pressure higher than vacuum pressure from said first pressure source;
said means generating said control pressures from vacuum pressure and from pressure from said second pressure source;
a third pressure source of superatmospheric pressure;
and a vacuum pressure booster including an aspirator receiving superatmospheric pressure from said third pressure source and generating aspirated vacuum pressure, said vacuum pressure booster being connected to said means to deliver aspirated vacuum pressure thereto and provide said means with aspirated vacuum pressure, said means using vacuum pressure from said first pressure source and from said vacuum pressure booster in accordance with the supply available to generate said control pressures, said vacuum pressure booster assuring a sufficient supply of vacuum pressure for proper system operation when said first pressure source supplies insufficient vacuum pressure for proper system operation.

5. A vehicle road speed control system comprising
a differential pressure powered servomotor connected to control the vehicle engine and road speed;
means generating and delivering control pressures to said servomotor; a first pressure source of vacuum pressure and a second pressure source of atmospheric pressure;
said generating and delivering means generating said control pressures from vacuum pressure and from atmospheric pressure;
a third pressure source of superatmospheric pressure; and a vacuum pressure booster including:
a housing having an expansion chamber formed therein, an axially aligned inlet passage and aspirator nozzle, said nozzle opening into said expansion chamber, another passage in axial alignment with said aspirator nozzle and opening into one side of said expansion chamber on the axially opposite side thereof from said aspirator nozzle, and a vacuum passage opening into said one side of said expansion chamber at a point offset from said nozzle, said inlet passage and aspirator nozzle being adapted to receive superatmospheric pressure from said third pressure source and discharge it through said expansion chamber and said axially aligned another passage to generate an aspirated vacuum pressure in said expansion chamber and said vacuum passage,
and connecting means connecting said vacuum passage to said generating and delivering means to deliver the aspirated vacuum pressure thereto for use as a power pressure, said connecting means also connecting said first pressure source to said generating and delivering means to deliver vacuum pressure from said first pressure source thereto for use as a power pressure.

6. In a vehicle road speed control system utilizing vacuum as a power pressure and having a primary source of vacuum pressure, a vacuum booster comprising:
a housing having an expansion chamber formed therein, an axially aligned inlet passage and aspirator nozzle formed at one end of said inlet passage, said nozzle opening into said expansion chamber, another passage in axial alignment with said aspirator nozzle and opening into one side of said expansion chamber on the axially opposite side thereof from said aspirator nozzle, a vacuum passage opening into said one side of said expansion chamber at a point of offset from said nozzle, a first check valve opening said vacuum passage to said expansion chamber only when pressure in said expansion chamber is less than pressure in said vacuum passage, a second check valve opening said vacuum passage to atmosphere when pressure in said vacuum passage increases to atmospheric pressure and closing said vacuum passage to atmosphere when pressure in said vacuum passage decreases below atmospheric pressure by a small predetermined value, said another passage being connected with said primary source of vacuum pressure, said inlet passage and aspirator nozzle being adapted to receive superatmospheric pressure and discharge it through said expansion chamber and said axially aligned another passage to generate an aspirated vacuum pressure in said expansion chamber and in said vacuum passage by opening said first check valve and closing said second check valve;
and means connecting said vacuum passage in said system to deliver the aspirated vacuum pressure and vacuum pressure from said primary source thereto for use as a power pressure.

* * * * *